United States Patent Office 3,475,039
Patented Oct. 28, 1969

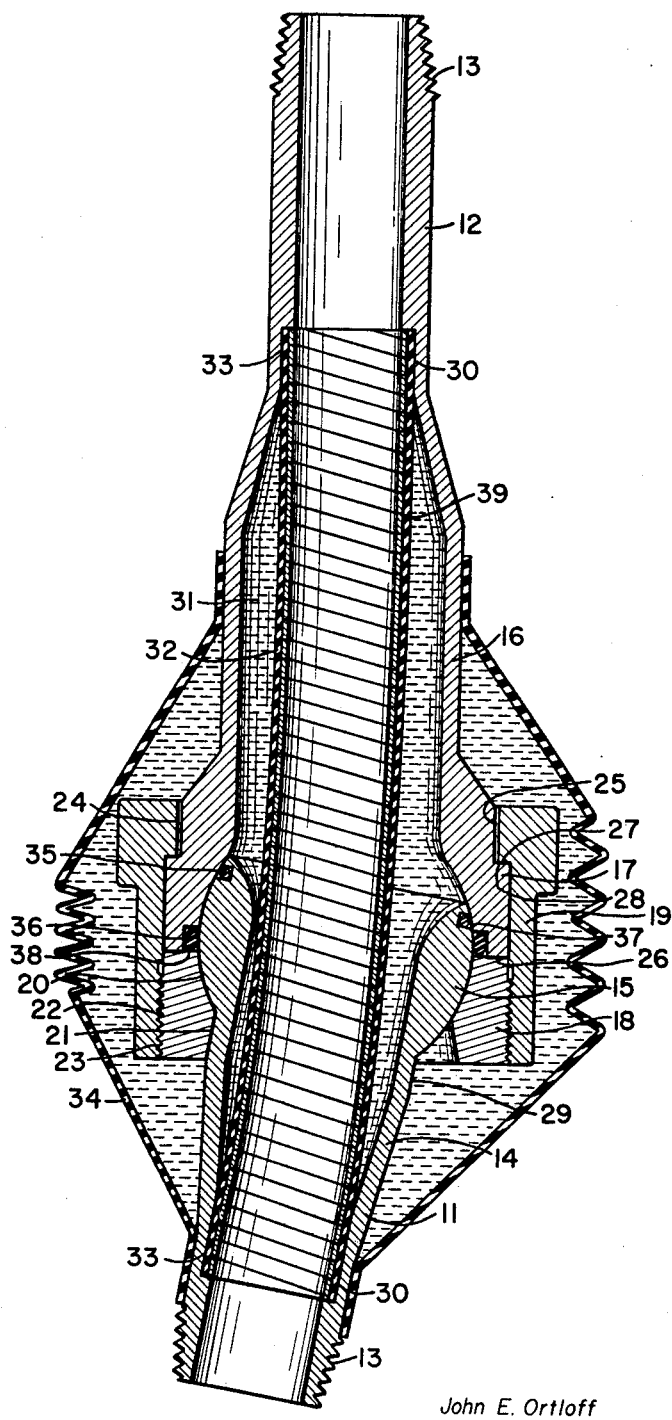

3,475,039
UNIVERSAL BALL JOINT FOR PRESSURIZED FLOW LINES
John E. Ortloff, Houston, Tex., assignor to Esso Production Research Company, a corporation of Delaware
Filed Sept. 18, 1967, Ser. No. 669,362
Int. Cl. F16l 55/00, 11/12
U.S. Cl. 285—45                  12 Claims

ABSTRACT OF THE DISCLOSURE

A ball joint for use in pressurized conduits through which elongated tools must pass including a male ball joint segment forming the end of a first pipe sub and a female ball joint segment forming the end of a second pipe sub, a locking apparatus holding the male and female segments together, packing elements forming a pressure-tight seal between the segments, a substantially smoothbore flexible sleeve attached at both ends to the internal surfaces of the pipe subs to form a substantially smooth conduit through the ball joint, and means to limit the amount of angular flex between the pipe subs to provide maximum clearance for the passage of elongated tools.

BACKGROUND OF THE INVENTION

Field of the invention

This invention relates to ball joints for connecting conduits and more particularly to those ball joints which connect pressurized conduits through which elongated rigid tools must be passed.

Description of the prior art

Many oilfield applications require conduits that are not only flexible but that will permit the passage of elongated tools as well. This is particularly important in the offshore production of oil and gas. Produced fluids from wells completed on the ocean bottom are conducted by flowlines to storage equipment which may be located on a rigid production platform, a floating production platform, or a floating storage vessel. Wind, waves, and currents act upon these surface facilities, causing them to move relative to the subsurface and making it necessary for the lines to be flexible. The degree of flexing must be limited because of the necessity of introducing through-flowline tools into the well to perform remedial work. These tools generally require that there be no sharp bends in the lines.

Equipment commercially available for flexible lines intended for high-pressure service includes certain types of flexible hoses and a variety of different ball joints for connecting rigid pipe members. Both classes of equipment have serious disadvantages. The flexible hose is expensive compared to conventional flowline tubing and may have a relatively short life in an underwater environment. Moreover, because of its construction, the passage of tools with sharp blades such as paraffin scrapers may further reduce the useful life of flexible hose in these applications.

The use of conventional ball joints to connect rigid pipe members in underwater risers and similar lines is impractical. Although such ball joints are designed with a limited degree of flexure, there is no relationship between this and that which would be required for the clearance of through-flowline tools. A more important problem, however, is the existence of beveled edges and void spaces which may cause through-flowline tools to stick in conventional ball joint assemblies. In order to free the stuck tool, major subsurface operations often are required, causing serious losses of time and requiring substantial financial outlay. For these reasons, conventional equipment leaves much to be desired.

SUMMARY OF THE INVENTION

This invention provides an improved ball joint which largely eliminates the problems outlined above. The ball joint of the invention includes a male ball joint segment forming the end of a first pipe sub, a female ball joint segment forming the end of a second pipe sub, a locking apparatus holding the male and female segments together, means through which sealing pressure is exerted between the joint segments, a smooth bore flexible sleeve which is attached at both ends to the internal surfaces of the pipe subs to form a substantially smooth conduit with no shoulders or beveled edges through the ball joint, and means to limit the amount of angular flex between the pipe subs to provide clearance for the passage of elongated tools. This ball joint has the advantage that it can be used in flexible risers and other lines which must be limited with respect to the degree of flexure at any particular joint to permit through-flowline tools to pass through the angles in the line. In addition, the interior of the ball joint is substantially smooth, thus eliminating the problem of tools sticking in the joints of flexible lines. The ball joint of this invention therefore has many advantages over commercially available equipment.

BRIEF DESCRIPTION OF THE DRAWINGS

The drawing is a longitudinal cross-sectional view of a ball joint constructed in accordance with the invention.

DESCRIPTION OF THE PREFERRED EMBODIMENTS

The ball joint assembly of the invention as depicted in the drawing comprises two tubular members 11 and 12 joined together to form a ball joint. Each of these pipe subs has a coupling means at one end which is used to join the ball joint assembly to other pipe members. Although depicted as threaded pins 13, these coupling means could be any of a number of suitable connectors such as threaded couplings, quick-connect couplings, or blank pipe suitable for welding. Pipe sub 11 is flared outwardly from the diameter of the end containing the coupling means, this flared section 14 terminating in the male segment of the ball joint 15. Although preferably coupling means 13, flared section 14, and the male segment of the ball joint 15 are integral parts of pipe sub 11, the sub could also be constructed in several sections and joined together. Pipe sub 12 also flares outwardly from the coupling diameter, and this flared section 16 terminates in the female segment of the ball joint 17. Coupling means 13, flared section 16, and the female segment of the ball joint 17 are preferably integral parts of pipe sub 12 although, like pipe sub 11, pipe sub 12 could be of sectional construction.

A locking apparatus to hold the male and female segments of the ball joint together is comprised of externally threaded, generally cylindrical collar member 18 and internally threaded coupling member 19, which is also essentially cylindrical. Collar member 18 has the interior surface of one end rounded into a frusto-spherical orifice 20 that matches the curvature of the male segment of the ball joint. Thus orifice 20 of collar member 18 retains the ball in the socket yet accommodates its pivotal motion. The interior surface of the opposite end of collar member 18 forms a beveled frusto-conical orifice 21 that acts as a shoulder limiting the flexure of pipe sub 11 in relation to pipe sub 12.

Coupling member 19 is provided with internal threads 22 to match the external threads 23 of collar member 18 on one end and on the other end has a reduced diameter circular collar section 24 that extends inwardly near the end of the member. This collar fits over the necked-down section 25 of female ball joint member 17. When threads 22 and 23 are made up, the end of collar member 18 fits against bearing surface 26 of female ball joint member 17. Bearing surface 27 of the circular collar of coupling member 19 rests against bearing surface 28 of the necked-down section of female ball joint member 17, placing coupling member 19 in tension and locking the male and female ball joint members together. This locking assembly is preferred because of its simplicity but the inventive concept could be embodied by substituting other locking methods which are known in the art. Some of these are exemplified by commercially available ball joints such as the Unibolt Flexi-Ball Joint manufactured by Thornhill-Craver Company, Inc., Houston, Tex., and illustrated in volume 3 of the 1966–67 Composite Catalog at 4847. Others are manufactured by the Chicksan Division of F.M.C. Corporation, Brea, Calif., and by the Barco Division of Aeroquip Corporation, Barrington, Ill. These are shown in volume 1 of the 1966–67 Composite Catalog on pages 1353 and 278, respectively.

The angular flexing of the pipe members is limited by the walls of beveled frusto-conical orifice 21 in collar member 18. The dimensions of this orifice in relation to the diameter of neck 29 of the male segment of the ball joint will determine the maximum angular flexure between the two pipe members. Pipe sub 11 is free to flex pivotally within the ball joint in any direction, but the maximum angular flexure is attained upon pipe sub 11 reachnig the limit imposed by beveled surface 21 of collar member 18.

A flexible inner member 39 is attached at both ends to the inner diameter of pipe members 11 and 12. The inner bores of these two members are grooved as indicated by reference numeral 30 so that the inner bore of flexible sleeve 39 and of the pipe member form a substantially flush joint. The inner bore of the flexible sleeve is substantially the same diameter as the inner bore of pipe segments 11 and 12 in the nonflared sections. One preferred material for use as a smooth bore flexible sleeve is a helically wound spring made of rectangular wire and illustrated in the drawing. An alternate would be a substantially smooth bore interlocking metallic conduit. The type of conduit construction that would be suitable is typified by the conduit manufactured by Electri-Flex Company, Roselle, Ill., and sold under the trade name of Liquatite. Another is marketed by Pittsburgh Standard Conduit Company, Verong, Pa., under the trade name Robroy Flex. Other suitable substitutes such as flexible tubing exit that are both flexible and have a substantially smooth bore and thus could be incorporated.

The space between sleeve 39 and the interior walls of pipe subs 11 and 12 and the interior surfaces of the ball joint is designated as 31 in the drawing and preferably contains a pliable packing material. This material should be able to flow so that flexure of sleeve 39 will not be restricted. A high viscosity rubber or resin is suitable. A viscous lubricant could also be used and is shown contained in this space. Where only slight flexure is anticipated a pliable non-liquid material can be used. Impervious sheath 32 on the outside of the sleeve is provided both to keep the packing material segregated from fluids that pass through the sleeve and to provide a broad area against which differential pressure may act to extrude the pliable packing material thus improving the sealing action of the packing material. This impervious sheath also forms a pressure-tight seal 33 with the internal surfaces of pipe subs 11 and 12 where the flexible sleeve is affixed to these pipe members. Preferably neoprene or some other impervious material which is resistant to oils should be used for sheath 32. If the flexible sleeve is not impervious and no sheath is used, so that pressure within the sleeve and in the void space between sleeve and ball joint is free to equalize, space 31 may be left void.

A genreally cylindrical flexible outer boot 34 is sealably attached to pipe members 11 and 12. Preferably an epoxy resin cement is used to attach the boot, but steel bands would also be satisfactory. The boot contains a lubricant such as grease which contacts the exterior surfaces of the ball joint and keeps it lubricated. The lubricant can be injected into the boot when it is manufactured or when the equipment is placed in service through ports which are not shown. The boot also serves as a protective shield to keep corrosive sea water away from the moving parts of the ball joint. Boot 34 should be made of flexible impervious substance such as the reinforced rubber boot material manufactured by Mercer Rubber Company of Trenton, N.J., and sold under the trade name of "Flexi-Gard."

Sealing means are incorporated in the ball joint to make it pressure tight. These sealing means include packing rings 35 and 36. Packing ring 35 is mounted in adapter groove 37 in the male portion of the ball joint and forms a seal against the female portion of the ball joint. Packing ring 36 is housed in adapter groove 38 in the female portion of the ball joint and forms a seal against the male portion of the ball joint. Supplementary sealing material can be placed in space 31 between sleeve 39 and the interior walls of pipe subs 11 and 12 and the interior surfaces of the ball joint as previously discussed. This supplementary sealing material should ordinarily be viscous so that it will be highly resistant to being extruded through the joint between the male portion and the female portion of the ball joint.

In operation, the ball joint assembly is connected to other pipe members with the coupling means 13 at each end. By using a number of such ball joint assemblies a flexible string of pipe is assembled. In a typical offshore petroleum installation flexible lines such as these are used as risers from the wellhead on the ocean floor to storage facilities located at the surface. Through-flow-line tools which are used for maintenance of the well will freely pass through the ball joint because of the limited flexure and because of the smoothbore flexible sleeve that passes through the ball joint. The permissible amount of flexure in the line to accommodate these rigid elongated tools is determined by the length and diameter of the tools in relation to the inner diameter of the ball joint and the line within which it is included. As discussed above, the amount of flexure that the ball joint will permit is governed by the dimensions of the beveled frusto-conical orifice in collar member 18 in relation to the diameter of neck 29 of the male portion of the ball joint. For through-flowline tools now commercially available, a 10-degree flexure can be tolerated without any adverse effects.

Although the invention has been discussed in terms of a flexible ball joint for use in riser lines from ocean bottom well completions, it should be apparent that it is equally applicable for use in forming other types of flexible pressurized conduits through which rigid or elongated tools must pass.

What is claimed is:

1. A ball joint assembly for connecting two conduits comprising:
   (a) a first tubular member having a male ball joint segment at one end thereof;
   (b) a second tubular member having a female ball joint segment at one end thereof;
   (c) means holding said male ball joint segment seated in said female ball joint segment and limiting the amount of angular flexure between said tubular members;
   (d) means preventing leakage between said male and female segments; and
   (e) a flexible inner member extending from within said first tubular member into said second tubular member forming a substantially smooth, uniform inner conduit therein, the inner diameters of said inner member, first and second tubular members being substantially equal at the junctures of the inner member with said first and second tubular members said conduit permitting said assembly to flex within predetermined angular limits while the inner bore remains substantially smooth and of substantially uniform diameter.

2. Apparatus as defined by claim 1 including a flexible boot sealably attached to the external surfaces of said first and second tubular members and extending over said means for holding said male and female segments together.

3. Apparatus as defined by claim 1 including:
   (a) a flexible, impervious sheath surrounding said flexible inner member and connected at its ends to the inner walls of said tubular members; and
   (b) a packing material interposed between said sheath and the interior surfaces of said tubular members.

4. Apparatus as defined by claim 3 wherein said packing material comprises a high viscosity liquid.

5. Apparatus as defined by claim 4 wherein said liquid is a lubricant.

6. Apparatus as defined by claim 1 including a pliable solid packing material interposed between said flexible inner member and the interior surfaces of said tubular members.

7. Apparatus as defined by claim 2 wherein a lubricant is interposed between said boot and the outer surfaces of said tubular members.

8. Apparatus as defined by claim 2 including:
   (a) a flexible, impervious sheath surrounding said flexible inner member and connected at its ends to the inner walls of said tubular members; and
   (b) a packing material interposed between said sheath and the interior surfaces of said tubular members.

9. Apparatus as defined by claim 1 wherein said flexible inner member comprises a helical spring.

10. Apparatus as defined by claim 1 wherein said flexible inner member comprises a flexible tubing.

11. Apparatus as defined by claim 1 wherein said flexible inner member comprises a flexible conduit.

12. A ball joint assembly for connecting two conduits comprising:

(a) a first tubular member having an at least partially spherical male ball joint segment at one end thereof;
(b) a second tubular member having an at least partially spherical female ball joint segment at one end thereof;
(c) a locking assembly holding said male ball joint segment seated in said female ball joint segment, said locking assembly limiting the amount of angular flexure between said tubular members;
(d) seal rings between said ball joint segments preventing leakage from the assembly;
(e) a substantially smoothbore flexible sleeve attached to said tubular members and extending through said male and female segments forming an inner conduit therein, the inner diameters of said inner member, first and second tubular members being substantially equal at the junctures of the inner member with said first and second tubular members said sleeve permitting the assembly to flex within predetermined angular limits while the inner bore remains substantially smooth and of substantially uniform diameter;
(f) a flexible boot sealably attached to the external surfaces of said tubular members and extending over said locking assembly;
(g) a flexible, impervious sheath surrounding said flexible sleeve and sealably connected at both ends to the inner walls of said tubular members; and
(h) a packing material positioned between said sheath and the interior surfaces of said tubular members.

References Cited

UNITED STATES PATENTS

| | | | |
|---|---|---|---|
| 1,821,274 | 9/1931 | Plummer | 285—45 X |
| 2,256,386 | 9/1941 | Farrar et al. | |
| 2,427,456 | 9/1947 | Hoy | 285—94 X |
| 3,292,955 | 12/1966 | Luther | 285—261 |

FOREIGN PATENTS 671,291  5/1929  France.

DAVID J. WILLIAMOWSKY, Primary Examiner

D. W. AROLA, Assistant Examiner

U.S. Cl. X.R.

285—94, 261, 371